March 23, 1926.

J. E. A. CHAUVEUR 1,577,518

MACHINE FOR REMOVING THE HEADS AND GUTS OF FISH

Filed Feb. 14, 1925      2 Sheets-Sheet 1

Inventor
J.E.A. Chauveur
By Marks & Clerk
Attys.

March 23, 1926. 1,577,518
J. E. A. CHAUVEUR
MACHINE FOR REMOVING THE HEADS AND GUTS OF FISH
Filed Feb. 14, 1925  2 Sheets-Sheet 2

Inventor
J. E. A. Chauveur
By Marks & Clerk
Attys.

Patented Mar. 23, 1926.

1,577,518

UNITED STATES PATENT OFFICE.

JOSEPH EUGENE AMAND CHAUVEUR, OF CONCARNEAU, FRANCE, ASSIGNOR TO SOCIÉTÉ P. NAVARRE & FILS, OF PARIS, FRANCE.

MACHINE FOR REMOVING THE HEADS AND GUTS OF FISH.

Application filed February 14, 1925. Serial No. 9,335.

*To all whom it may concern:*

Be it known that I, JOSEPH EUGENE AMAND CHAUVEUR, of 23 Rue Jean Bart, Concarneau, Finistere, France, citizen of the Republic of France, engineer, have invented Machines for Removing the Heads and Guts of Fish, of which the following is a full, clear, and exact description.

This invention has for object a machine for removing the heads and guts of fish treated for obtaining preserves.

Up to now, this very long operation was effected by women at an average of five hundred fishes per hour or about two hundred thousand per day for an ordinary establishment.

But owing to the actual crisis in feminine labour and of the high rate of salaries, the increase, in the cost price of this operation for removing the heads and guts of fish, leads to the closing of the market and the fisherman is no longer able to sell his fish.

By using the machine forming the subject-matter of the invention, the removing of the heads of fish can be effected with ten times less labour than is necessary by the actual methods.

The accompanying drawing illustrates, by way of example, one of the forms of construction of the machine forming the subject-matter of the present invention.

Figure 1:
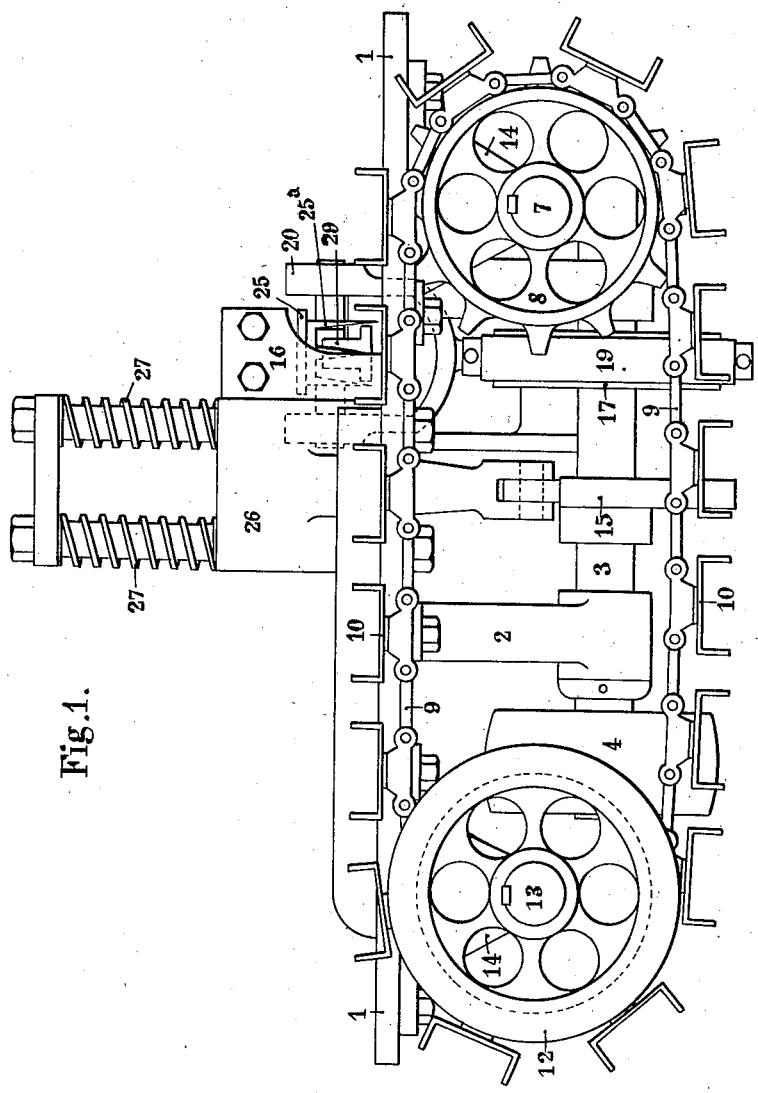
Fig. 1 is a longitudinal elevation of the said machine.
Figure 2:
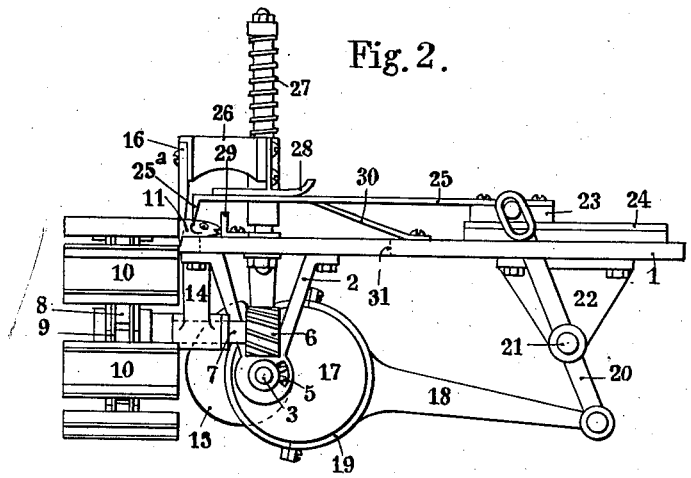
Fig. 2 is a side view.
Figure 3:
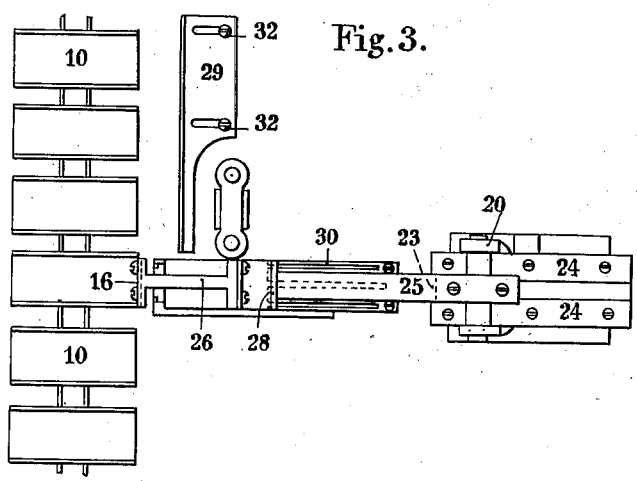
Fig. 3 is a plan view.

The machine comprises a frame 1 which carries in supports 2, the shaft 3 driving the mechanism and receiving its movement from any prime mover by means of the pulley 4, for instance.

The shaft 3 carries on its end opposed to that where the driving pulley is mounted, a helical segment 5 capable of gearing with a helical pinion 6 rigidly secured on a shaft 7 carrying a toothed wheel 8. The teeth of this wheel 8 gear with the links of a chain 9 externally carrying U-shaped buckets 10 in each of which is placed a fish 11. A drum 12 fast on an axis 13 serves as a guide and tension device for the chain 9 during its movement. The axes 7 and 13 are journalled in supports 14 connected to the frame 1. On the driving shaft 3 are also rigidly secured a cam 15 adapted to control a knife or cutter 16 and an eccentric 17, the rod 18 of the strap of which is connected to a forked link 20 the axis of rotation 21 of which is carried by a support 22 of the frame.

The link 20 actuates a slide-block 23 guided in a slide 24 and on which is arranged a resilient arm 25 the end of which is bent and forms a fork 25ª. The knife or cutter 16 is carried by a slide-block 26 constantly urged downward by springs 27 and is provided with a shoe 28. A longitudinal abutment 29, adjustable on the frame limits the issue of the head of the fish outside each bucket 10. The machine is completed by an incline 30 and a discharge orifice 31 for the heads and guts of the fishes.

The operation of the machine is as follows:

According to the size of the fish to be treated, the abutment 29 is moved on the frame 1 for bringing it to the suitable position in order that the head of each fish extends outside each bucket, then the two screws 32 are tightened when this abutment is in the desired position.

The buckets 10 each containing a fish, the chain 9, at each stoppage, presents one of these fishes opposite the knife or cutter 16. By causing the driving shaft 3 to rotate in a counter-clockwise direction, the cam 15 clears the slide-block 26 carrying the knife 16, so that the latter suddenly falls under the action of the springs 27 and cuts the fleshy part of the fish head near the gills, whilst at the same time the fork 25ª is driven into the head under the thrust exerted by the shoe 28 on the resilient arm 25 carrying this fork. Then the eccentric 17, through the medium of its rod 18 and of the link 20 imparts a rectilinear movement from left to right to the fork 25ª. The body of the fish is maintained in its bucket 10 by the knife 16 acting as an abutment, the head carried along by the fork 25ª is pulled off, the guts follow up to the incline 30, the resilient arm 25 freed from the pressure of the shoe 28 determines the lifting of the fork 25ª, the latter abandoning the head and guts which are discharged through the orifice 31.

Then the cam 15 causes the knife 16 to rise and the fork 25ª comes back to its starting position.

The driving shaft 3 continuing its movement, the segment 5 comes in engagement with the pinion 6 and causes the chain 9 to move forward in order to bring again opposite the knife 16 another bucket 10 containing another fish.

It is moreover to be understood that the invention is not limited to the arrangements described; the driving, locking and stop members can be of any type provided which permit of obtaining the desired result.

Claims:

1. A machine of the character described including a support, a knife mounted for movement on said support and adapted to sever the fleshy part of the fish head, a fork movable in a direction at right angles to the knife and including penetrating teeth adapted to penetrate the fish head and grip and remove the latter with the entrails from the fish.

2. A machine of the character described including a support, a knife mounted for movement on said support and adapted to sever the fleshy part of the fish head, a fork movable in a direction at right angles to the knife and including penetrating teeth adapted to penetrate the fish head and grip and remove the latter with the entrails from the fish, a carrier mounted on the support to deliver fish adjacent the knife and to successively present fish for the cutting operation.

3. A machine of the character described including a support, a knife mounted for movement on said said support and adapted to sever the fleshy part of the fish head, a fork movable in a direction at right angles to the knife and including penetrating teeth adapted to penetrate the fish head and grip and remove the latter with the entrails from the fish, a carrier mounted on the support to deliver fish adjacent the knife and to successively present fish for the cutting operation, a movable abutment for determining the position of the heads of the fish moving with the carrier.

4. A machine as claimed in claim 1 characterized by the provision of a slide block mounted on the support and carrying the knife and a shoe carried by the slide block and engageable with the fork for effecting the penetrating movement of the teeth of the latter.

5. A machine as claimed in claim 1 characterized by the provision of spring means for effecting the cutting movement of the knife, and means for returning the knife to inactive position against the tension of the spring means.

6. A machine as claimed in claim 1 characterized by the provision of spring means for effecting the cutting movement of the knife, and means for returning the knife to inactive position against the tension of the spring means, and means for effecting reciprocating movement of the fork.

7. A machine of the character described including a support, a cutting knife mounted for vertical reciprocation on said support, a fork mounted for horizontal reciprocation on said support, a carrier mounted to travel on the support for successively bringing fish to operative position relative to the knife, spring means for effecting the cutting stroke of the knife, means for effecting reciprocation of the fork and also acting to return the knife to inoperative position against the tension of the spring means, a shoe carried by the knife and engageable, during the cutting stroke of the latter with the fork to effect penetrating movement of the latter.

8. A machine as claimed in claim 7 characterized by the provision of an adjustable abutment arranged laterally of the carrier for disposing the fish moving with said carrier in proper position for the cutting action of the knife.

The foregoing specification of my machine for removing the heads and guts of fish, signed by me this 30th day of January, 1925.

JOSEPH EUGENE AMAND CHAUVEUR.